United States Patent
Elm et al.

(10) Patent No.: US 6,793,147 B2
(45) Date of Patent: Sep. 21, 2004

(54) HEATING SYSTEM AND PROCESS FOR INFLUENCING AIR FLOWS IN A HEATING SYSTEM

(75) Inventors: Nils Elm, Planegg (DE); Andreas Ludwig, Penzberg (DE); Andreas May, Munich (DE); Nikolaus Gerhardt, Oberschleissheim (DE); Friedrich Widemann, Munich (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 10/173,562

(22) Filed: Jun. 18, 2002

(65) Prior Publication Data

US 2003/0019945 A1 Jan. 30, 2003

(30) Foreign Application Priority Data

Jun. 18, 2001 (DE) .......................................... 101 29 205
Mar. 4, 2002 (DE) .......................................... 102 09 519

(51) Int. Cl.$^7$ ............................................... B60H 1/02
(52) U.S. Cl. ............................ 237/12.3 C; 237/12.3 A; 165/41
(58) Field of Search ..................... 237/12.3 A, 12.3 R, 237/12.3 C; 165/41, 42

(56) References Cited

U.S. PATENT DOCUMENTS

| | | | | |
|---|---|---|---|---|
| 4,192,456 A | * | 3/1980 | Shields et al. | 237/12.3 R |
| 4,205,944 A | * | 6/1980 | Rohrberg et al. | 417/32 |
| 4,523,633 A | * | 6/1985 | Furukawa et al. | 165/76 |
| 4,821,792 A | * | 4/1989 | Bednarek | 165/231 |
| 4,915,615 A | * | 4/1990 | Kawamura et al. | 431/41 |
| 5,253,475 A | * | 10/1993 | Kabasin | 60/274 |
| 5,501,267 A | * | 3/1996 | Iritani et al. | 165/202 |
| 5,927,269 A | * | 7/1999 | Quarrie | 431/168 |
| 6,021,752 A | * | 2/2000 | Wahle et al. | 123/142.5 R |
| 6,079,629 A | * | 6/2000 | Morikawa et al. | 237/12.3 C |

* cited by examiner

Primary Examiner—Derek S. Boles
(74) Attorney, Agent, or Firm—Nixon Peabody LLP; David S. Safran (57) ABSTRACT

A heating system for heating air, especially for heating the interior of a motor vehicle, with a first heater (10), a second heater (12), and a flow path between the first heater (10) and the second heater (12), there being at least one auxiliary fan (50) with which a flow in the direction from the second heater (12) to the first heater (10) can be produced and a process for influencing the air flows in the heating system are designed to counteract overpressurization. Furthermore, an air heater and a process for detecting backflowing hot air through an air heater use a temperature sensor in an inlet area of the heater for that purpose.

12 Claims, 5 Drawing Sheets

HEATING SYSTEM AND PROCESS FOR INFLUENCING AIR FLOWS IN A HEATING SYSTEM

BACKGROUND OF THE INVENTION

1. Field of the Invention

The invention relates to a heating system for heating air, especially for heating the interior of a motor vehicle, with at least a first heater, at least a second heater, and at least one flow path between the first heater and the second heater. The invention also relates to a process for influencing air flows in a heating system for heating air, especially for heating the interior of a motor vehicle, with at least one first heater, at least one second heater, and at least one flow path between the first heater and the second heater. Furthermore, the invention relates to an air heater with a burner, a heat exchanger, an air inlet area, an air exit area, a control device and a temperature sensor which is located in the air inlet area, the temperature in the air inlet area being monitored by means of the temperature sensor which is located in the air inlet area. The invention likewise relates to a process for detecting hot air flowing back through an air heater.

2. Description of Related Art

The use of generic heating systems and generic processes known, especially in the motor vehicle art. Such heaters are characterized by the interaction of a first heater—the motor vehicle heater or a combination of the motor vehicle heater and air conditioner—and a second heater, the auxiliary air heater. The motor vehicle heater or the combination of the motor vehicle heater and air conditioner is called the "front box." The combination of motor vehicle heater and air conditioner is also known as HVAC (Heat, Ventilation. & Air Conditioning). When in the description of the prior art and in the description of the invention a motor vehicle heater is addressed below, combinations of a motor vehicle heater with an air conditioner are also always intended.

Figures 14, 15:
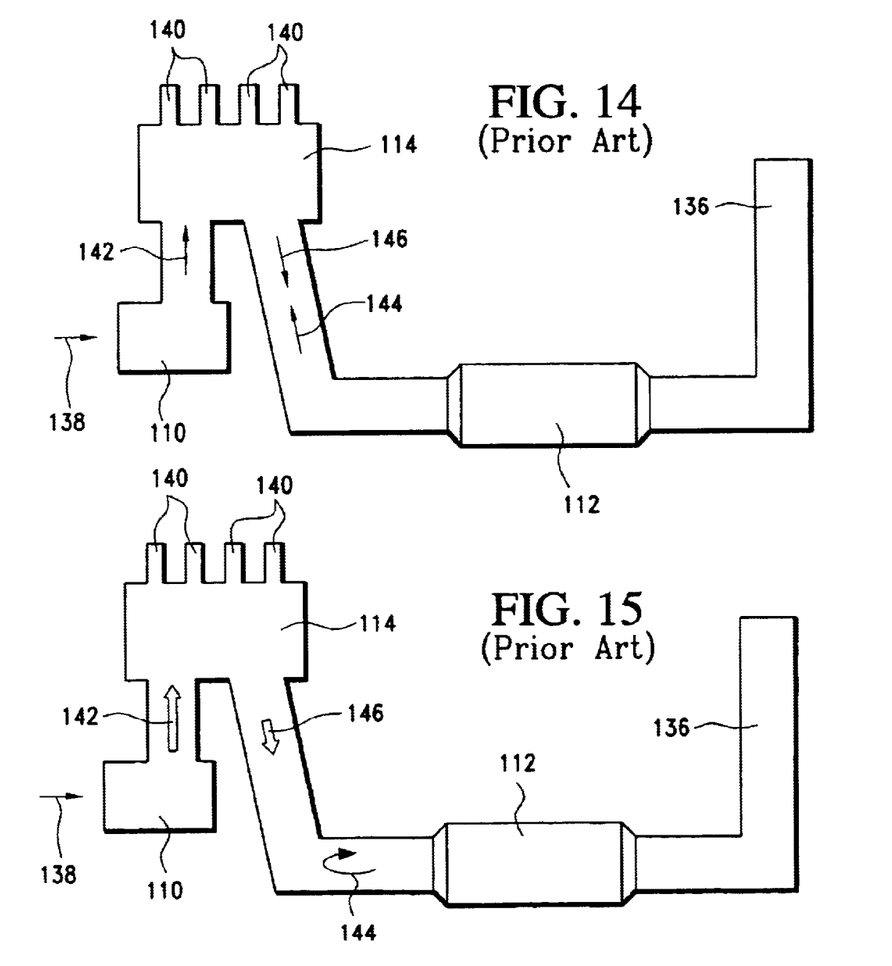
FIG. 14 shows a schematic of a heating system of the prior art with a noncritical flow state.
FIG. 15 shows a schematic of a heating system of the prior art with a critical flow state.

FIG. 14 schematically shows the structure of a system of the prior art. A motor vehicle heater 110 with an air inlet 138 (which is not shown in detail) is connected to a mixing chamber 114. Furthermore, there is an auxiliary heater 112 which has an air inlet 136. The auxiliary heater 112 is also connected to the mixing chamber 114. The mixing chamber 114 has several air channels 140 for the emergence of air. Generally, in the mixing chamber 114, it is possible to reroute the volumetric flow entering there via flaps into the different air channels 140 or to close the air channels 140. In this way, the user is able to undertake various settings for climate control of the interior of the motor vehicle.

In normal operation of the heating system shown in FIG. 14, an air flow 142 emerges from the motor vehicle heater 110 and enters the mixing chamber 114. Likewise, an air flow 144 emerges from the auxiliary heater 112 and enters the mixing chamber 114. As a result of these air flows 142, 144, which are inherently independent of one another, countercoupling can result which can lead, for example, to a counterpressure 146 against the flow 144 of the auxiliary heater 112. In FIG. 14, the counterpressure 146 is a small amount so that proper operation of the heating system is possible.

FIG. 15 shows a system with a structure which corresponds to that from FIG. 14. In contrast to the operating state which is shown schematically in FIG. 14, the heating system as shown in FIG. 15 does not work properly. This results from the increased counterpressure 146 which, in this case, is so great that it causes a reversal of the air flow 144.

The formation of the operating states shown in FIG. 14 and in FIG. 15 and the resulting problems are explained below.

The motor vehicle heater has a fan which blows air into the mixing chamber with a high volumetric flow and relatively low pressure stiffness. The term pressure stiffness is defined as the potential of a pressure build-up. A high pressure stiffness stands, for example, for the potential to apply a high pressure. The fan of the motor vehicle heater can be controlled continuously or in stages, and this control can be undertaken especially independently of the thermodynamic states in the heating system.

In addition, the auxiliary heater has a fan. The latter, in contrast to the fan of the motor vehicle heater, is relatively pressure-stiff, but with a smaller volumetric flow being produced. In current auxiliary heaters, the fan of the auxiliary heater, in principle, cannot be controlled independently of the heat output of the auxiliary heater. When more heat output is required, the volumetric flow is also increases and vice versa. Based on the change of the volumetric flow of the auxiliary heater, however, the pressure stiffness also changes. The blow-out temperature on the auxiliary heater is dependent, among others, on the resistances opposing the auxiliary heater. For a high resistance, this can lead to an elevated blow-out temperature which is limited by adjusting the auxiliary heater down or turning it off.

Therefore, for operation of the auxiliary heater, it is ideal if it can run at low outside temperatures, with high heat outputs, i.e., high volumetric flows, and thus, high pressure stiffness. The auxiliary heater can then react to the fan of the motor vehicle heater, especially when the latter is operated at low fan stages or if only a few flaps in the mixing chamber are closed.

The problem arises when the auxiliary heater must reduce the heat output as a result of rising temperatures. Based on the above described regularities, then the pressure stiffness, and moreover, the possibility of adequately reacting to the motor vehicle fan decrease, a state results in which the resistance for the auxiliary heater becomes higher and higher, and the auxiliary heater continually adjusts the heat output down. This can lead to the counterpressure which is produced by the motor vehicle heater fan being higher than the pressure of the auxiliary heater. This state is also called overpressurization. The heat of the auxiliary heater can then no longer be delivered. In the extreme case, it is transported in the opposite direction. This can lead to the fact that the overheating protection generally located in the outlet area of the auxiliary heater can be shut down. Furthermore, serious damage to the entire system can occur, for example, in the inlet area or on the control device of the auxiliary heater.

SUMMARY OF THE INVENTION

Therefore, a primary object of the present invention is to provide a heating system and a process which eliminate the aforementioned disadvantages and which especially prevent overpressurization in the heating system.

This object is achieved with the features of the invention described below.

The invention is based on a generic heating system in that there is at least one auxiliary fan with which a flow can be produced in the direction from the second heater to the first heater. This makes it possible to increase the volumetric flow or the pressure from the second heater in the direction of the motor vehicle heater to such an extent that the second heater is not overpressurized under any conditions. Furthermore, there is no need to dam the flow connection between the second heater and the motor vehicle heater, stable and careful heater operation being ensured nevertheless. In this way, even at low rpm of the second heater, overpressurization can be prevented. In the second heater, on the average, lower temperatures prevail so that the components are less stressed. Uniform operation of the second heater, which requires especially fewer control cycles, can take place by which the burner in the second heater is less stressed. Furthermore, the heat energy contribution of the second heater can be increased since the maximum heat output becomes greater. A cleaner start and burnout cycle can be ensured. Since it is not necessary to interrupt the flow connection between the first heater and the second heater, the heat energy from the second heater is always optimally used.

The invention develops its advantages especially in that the first heater is the motor vehicle heater and that the second heater is the auxiliary heater. The invention can be used advantageously for the interplay of heaters in any environment. Special advantages arise however when used in a motor vehicle. There, auxiliary heaters are often combined with motor vehicle heaters or with motor vehicle heating systems which are already in use. The invention enables easy integration by making available stable flow conditions of the auxiliary heater which is to be incorporated in the vehicle system.

Preferably, there is at least one mixing chamber which air can enter which has flowed out of at least the first heater and out of at least the second heater. Such a mixing chamber can be used to route air with a uniform temperature into the interior of the motor vehicle. The connection of the motor vehicle heater to the auxiliary heater generally takes place via this mixing chamber, and then problems in overpressurization can also occur. In particular, a mixing chamber often has flaps with which channels can be entirely or partially closed so that the counterpressure against the flow from the auxiliary heater can be very high.

It is especially advantageous that the auxiliary fan is located upstream of the second heater. This position is preferable since, in this way, the auxiliary fan is not exposed to thermal stress. Likewise, it is possible for the auxiliary fan to be moved into the area of the air inlet of the auxiliary heater. However, it is also within the scope of this invention to place an auxiliary fan behind the auxiliary heater. This is possible especially when an auxiliary fan is chosen which withstands higher thermal stress.

In another, especially preferred embodiment, the heating system in accordance with the invention is developed such that the auxiliary fan can be actuated depending on the output signal of a control device. Such a control device can incorporate numerous input data in the decision whether to actuate the auxiliary fan. Here, input signals are considered which are linked directly to the heating system. However, also other signals can be evaluated, for example, CAN bus signals.

It is especially advantageous that, to detect the pressure states in the heating system, there is at least one pressure sensor for generating an input signal for the control device. Such a pressure signal can be produced, for example, by a pressure differential sensor, the difference between the pressure upstream of the auxiliary heater and the pressure in or downstream of the auxiliary heater being measured. When the pressure difference is too high, there is a high probability of overpressurization, so that measures can be initiated by the control device, for example, the auxiliary fan can be connected. It is also possible for damming to occur at low pressures. Likewise, for example, at high rpm, there can be a high pressure without damming.

In the same sense, it is preferred that, to detect the pressure states in the heating system, there is at least one pressure sensor for generating an input signal for the control device, temperature signals can be evaluated, for example, by gradient evaluation. If the temperature sensor is installed, for example, in the vicinity of the output of the auxiliary heater, in the case of overpressurization, a sudden temperature drop can occur in the area of this temperature sensor. Since such a temperature drop could not be present at a uniform or increasing heat output without the presence of overpressurization, overpressurization can be concluded from the temperature drop. Likewise, it is possible to install several temperature sensors in the area of the auxiliary heater and to draw conclusions regarding a possible overpressurization from the three-dimensional temperature variation.

It is especially preferred that the auxiliary fan can be controlled. This control can take place continuously or in steps, these control tasks preferably being assumed by the control device of the auxiliary heater. It is likewise possible to provide control which takes place in increments or which is continuous. In another operating mode, the system can be designed such that the auxiliary fan is only turned on or off. To do this, for example, a relay can be used.

It can likewise be advantageous for the auxiliary fan to be actuated directly depending on the output signal of the temperature sensor. Such a temperature sensor can be, for example, a bimetallic component so that triggering of the auxiliary fan can take place independently of the control device.

The invention is based on the generic process in that at least one auxiliary fan produces a flow in the direction from the second heater to the first heater. In this way, the properties explained in conjunction with the heating system and the advantages of the invention are also implemented within the framework of the process. This likewise applies to the embodiments of the process indicated below.

The invention develops its advantages especially in that the first heater is the motor vehicle heater and that the second heater is the auxiliary heater.

Preferably, there is at least one mixing chamber which air can enter which has flowed out of at least the first heater and out of at least the second heater.

It is especially advantageous that the auxiliary fan is actuated depending on the output signal of the control device.

In the aforementioned connection, it is especially advantageous that pressure states in the heating system are detected by at least one pressure sensor and that a pressure-dependent input signal for a control device is produced.

In the same sense, it is preferred that temperature states in the heating system are detected by at least one pressure sensor and that a pressure-dependent input signal for a control device is produced.

Furthermore it can useful for the auxiliary fan to be controlled.

In another useful embodiment of the process of the invention, it is provided that the auxiliary fan is actuated directly depending on the output signal of the temperature sensor.

It can be useful for the auxiliary fan to be turned on and off when the second heater is turned on and off. The auxiliary fan is therefore used only for support for the fan of the second heater and especially only during heating operation of the second heater.

However, it can also be useful for the auxiliary fan to be turned on and off when the first heater is turned on and off. Since there is the danger of overpressurization of the heating system during the turn-on phase of the first heating system, such an operating mode of the auxiliary fan can be efficient.

In another version, the auxiliary fan is turned on when overpressurization of the heating system is detected. In this way, the operating time of the auxiliary fan is minimized since it is only turned on when the state for which the heating system with an auxiliary fan is designed is present.

The invention is based on a generic air heater in that when a boundary value is exceeded by a temperature-dependent quantity, the burner is transferred into a state with lower heat output. In this way, the temperature sensor which is used in normal operation to determine the air inlet temperature is used in the air inlet area of the air heater to determine the backflow of heated air. This takes place via determination of a temperature-dependent quantity. If this temperature-dependent quantity exceeds a certain boundary value, countermeasures can be taken in which especially the burner is transferred into the state with lower heat output. Consequently, undesirable overheating of electronic components, for example, in the area of the control device, is opposed.

For example, the air heater of the invention can be used such that, when the boundary value is exceeded by the temperature-dependent quantity, the burner is turned off. Consequently, further heating of hot air is minimized, by which an especially effective countermeasure is made available.

Furthermore, within the framework of this invention, it can be provided that the temperature-dependent quantity is the temperature gradient over time so that when the maximum positive temperature gradient is exceeded, the burner is turned off. The rate of temperature increase can therefore be used as the criterion since a more or less sudden temperature rise indicates incipient flow reversal. Therefore, by monitoring the temperature gradient, a countermeasure against flow reversal or against overheating of the components in the entry area can be taken.

Likewise, alternatively or in addition to the gradient evaluation, it is possible for the temperature-dependent quantity to be the temperature itself so that when the maximum temperature is exceeded, the burner is turned off. For example, if the temperature in the area of the temperature sensor in the air inlet area increases only slowly, this yields additional safety.

It is likewise possible for aftercooling to be carried out with or after transfer of the burner into a state with lower heat output. This aftercooling results in that components which may already be in the critical temperature state can be re-cooled quickly so that afterwards it is possible to pass back into normal burner operation.

Moreover, the invention includes a process for detecting backflowing hot air through an air heater in which the temperature in the air inlet area is monitored by a temperature sensor which is located in the air inlet area and when a boundary value is exceeded by the temperature-dependent quantity the burner of the air heater is transferred into the state with lower heat output. In this way, the advantages described in conjunction with the air heater of the invention are also realized within the framework of a process. This also applies to the advantageous embodiments of the process of the invention indicated below for detecting the backflowing hot air.

The process in accordance with the invention is especially advantageous when the burner is turned off when the boundary value is exceeded by a temperature-dependent quantity.

It is likewise especially useful if the temperature gradient over time is used as the temperature-dependent quantity so that when a maximum positive temperature gradient is exceeded the burner is turned off or is transferred into the state with lower heat output.

Furthermore, the process according to the invention can be especially advantageously designed so that, in addition or alternatively to the gradient evaluation as the temperature-dependent quantity, the temperature itself is used so that when a maximum temperature is exceeded the burner is turned off.

Likewise, within the framework of the process of the invention, it can be useful to carry out aftercooling with or after the transfer of the burner into the state with low heat output.

The invention is based on the finding that overpressurization and the associated problems in the area of an auxiliary air heater can be overcome by providing an auxiliary fan. In this way, it can be ensured that the volumetric flow and the pressure stiffness in the direction from the second heater to the first heater are always sufficient to overcome the counterpressure which is produced by the motor vehicle heater. Flow reversal within the air heater can be detected, for example, using the evaluation of a temperature gradient over time.

The invention is explained by way of example with reference to the accompanying drawings using preferred embodiments.

BRIEF DESCRIPTION OF THE INVENTION

DETAILED DESCRIPTION OF THE INVENTION

In the following description of the drawings the same reference numbers label the same or comparable components. Furthermore, in the following, the term "motor vehicle heater" means a heater that is part of the heating system of a motor vehicle and utilizes heat from the vehicle engine as its heat source, while the term "auxiliary heater" is used to mean a heater that does not utilize heat from the vehicle engine as its heat source but rather produces heat independent of the vehicle engine via, for example, a fuel-fired burner.

Figure 1:
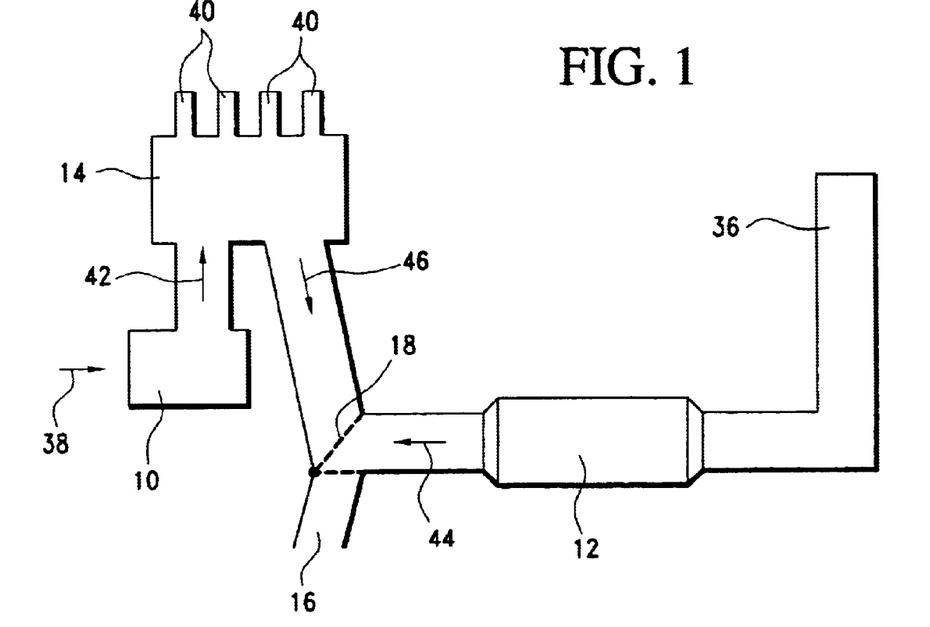
FIG. 1 shows a schematic of part of a heating system with a changeover damper.

FIG. 1 shows a schematic of a heating system with a first embodiment of the changeover damper 18. A motor vehicle heating system 10 with an air inlet 38 (which is not shown in detail) is connected to the mixing chamber 14. Furthermore, there is an auxiliary heater 12 which has an air inlet 36. The auxiliary heater 12 can also be connected to the mixing chamber 14. The mixing chamber 14 has several air channels 40 for the emergence of air. Generally, in the mixing chamber 14, it is possible to reroute the volumetric flow entering there via dampers into the different air channels 40 or to close the air channels 40. In this way, the user is able to undertake numerous settings for climate control of the interior of the motor vehicle.

Furthermore, in the connecting area between the auxiliary heater 12 and the mixing chamber 14, which is also the connecting area between the auxiliary heater 12 and the motor vehicle heater 10, there is an exhaust opening 16. In the area of this exhaust opening 16, the changeover damper 18 is hinged.

The changeover damper 18 is shown in two states and therefore with broken lines. In the first operating state, the changeover damper 18 closes the exhaust opening 16 and there is a connection between the auxiliary heater 12 and the mixing chamber 14 or the motor vehicle heater 10. In the second operating state, the changeover damper 18 closes this connection between the auxiliary heater 12 and the mixing chamber 14; the exhaust opening 16 is conversely cleared. The heating system with the first state of the changeover damper 16 corresponds therefore in flow engineering terms, in principle, to the heating system of the prior art which was explained using FIGS. 14 & 15. This first state of the changeover damper can therefore be assumed when the allowable flow state is present, as was explained using FIG. 14, especially therefore when there is no overpressurization by a counterpressure 46 which ultimately results from the emerging air 42 from the motor vehicle heater 10. In this case, the flow 44 from the auxiliary heater 12 has sufficient pressure stiffness to reach the mixing chamber 14. If the counterpressure 46 however increases so that ultimately a reversal of the flow 44 from the auxiliary heater 12 could occur, the changeover damper 18 closes the connection between the auxiliary heater 12 and the mixing chamber 14 or the motor vehicle heating system 10 and clears the exhaust opening 16. The flow 44 from the auxiliary heater 12 can then emerge through the exhaust opening 16. Thus, the auxiliary heater 12 which is strongly heated from time to time can cool off.

Switching of the changeover damper 18 can take place, for example, by an electrical servomotor (not shown) which is activated by the output signal of a control device (not shown). This control device can process a host of input signals, for example, pressure or temperature at different positions of the heating system. If, after a certain time of discharge of the flow 44 from the auxiliary heater 12 through the exhaust opening 16, it can be assumed that the auxiliary heater 12 is sufficiently cooled off, the changeover damper 18 can be returned to the first state since the pressure stiffness of the flow is with a certain probability enough to be able to overcome the counterpressure 46.

Figure 2:
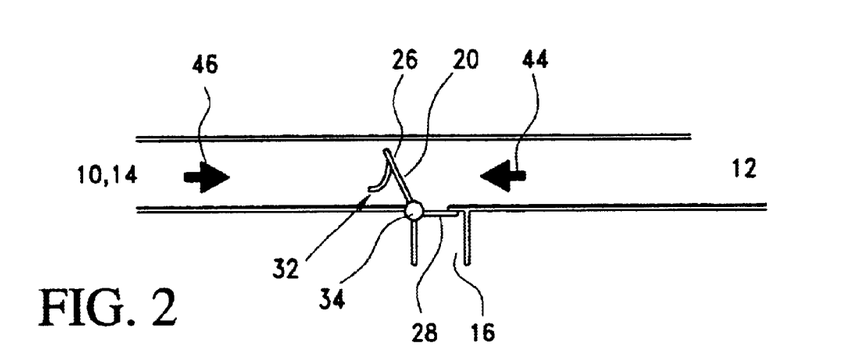
FIG. 2 shows a schematic of part of a heating system with a second embodiment of a changeover damper.

FIG. 2 shows a schematic of part of the heating system with a second embodiment of a changeover damper 20. The changeover damper 20 which is activated by flow mechanics in this example is located in the connecting line between the motor vehicle heater 10 or the mixing chamber 14 and the auxiliary heater 12. It is located therefore in the area of the flow 44 which is produced by the auxiliary heater and of the counterpressure 46 which is produced by the fan of the motor vehicle heater 10. The changeover damper 20 has a first area 26 which projects into the flow area. A second area 28 is used to close or clear the exhaust opening 16. The changeover damper 20 is furthermore equipped with a cover 32 on its first area 26 which is made here as elastomer tabs. The changeover damper 20 is hinged by means of an axle 34.

Figure 3:
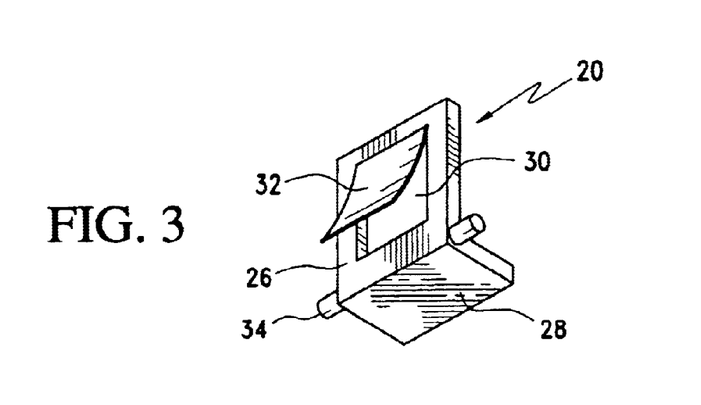
FIG. 3 shows a perspective of the second embodiment of a changeover damper.

FIG. 3 shows a perspective of the second embodiment of a changeover damper 20. One possible configuration of the changeover damper 20 can be recognized. Here, the first area 26 and the second area 28 form an L-shaped structure in cross section, the angle included by the first area 26 and the second area 28 being greater than 90°. The first area 26 furthermore has an opening 30. This opening can be cleared or closed by the cover 32. Based on the forces which act flow-mechanically on the changeover damper 20, the changeover damper 20 can be pivoted around the axle 34 by the hinged support.

Figure 4:
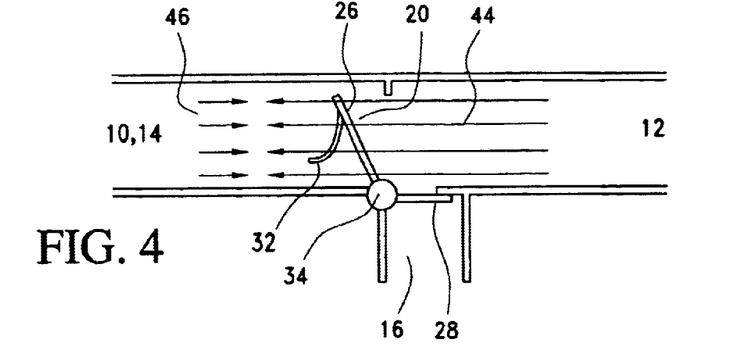
FIG. 4 shows a schematic of part of a heating system with the second embodiment of a changeover damper during a first flow state.

FIG. 4 shows a schematic of part of a heating system with the second embodiment of a changeover damper 20 during its first flow state. In the flow state shown here, the counterpressure 46 of the motor vehicle heater 10 is low. Thus, the auxiliary heater 12 can form a flow 44 in the correct direction. The changeover damper 20 is pressed in this way in the direction of the motor vehicle heater system 10 or the mixing chamber 14 and the cover 32 which acts as a nonreturn flap opens. The second area 28 of the changeover damper 20 closes the exhaust opening 16. So that unintentional opening of the exhaust opening 16 does not occur, although correct operation in itself can take place, the surfaces involved in the flow mechanics, i.e., the first area 26, the second area 28 and the cover 32, are matched accordingly to one another.

Figure 5:
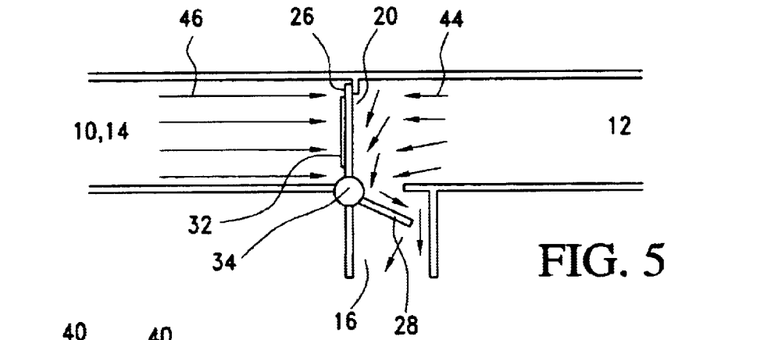
FIG. 5 shows a schematic of part of a heating system with the second embodiment of a changeover damper during a second flow state.

FIG. 5 shows a schematic of part of the heating system with the second embodiment of a changeover damper 20 during a second flow state. This flow state is achieved when the counterpressure 46 which comes from the direction of the motor vehicle heater 10 or the mixing chamber 14 rises. If this is the case, the nonreturn flap 20 closes increasingly. If the counterpressure 46 becomes so great that the flow 44 from the auxiliary heater 12 can no longer take place in the correct direction, the nonreturn flap 20 is completely closed. The building dynamic pressure forces the changeover damper 20 to flip over. Likewise, the cover 32 which acts as a nonreturn flap closes the opening (30, FIG. 3) of the first area 26 of the changeover damper 20. When the pressure 46 of the motor vehicle heater 10 drops, the flow 44 or the overpressure caused thereby on the nonreturn flap 20 forces it in turn to flip over in the other direction.

FIGS. 1, 2, 4 and 5 show the changeover dampers 18, 20 always in the connecting area between the mixing chamber 14 and the auxiliary heater 12. This is the preferred position of the changeover dampers 18, 20. Other positions are also possible, for example, directly at the output of the auxiliary heater 12 or in the area of the mixing chamber 14 or the motor vehicle heater 10.

Figure 6:
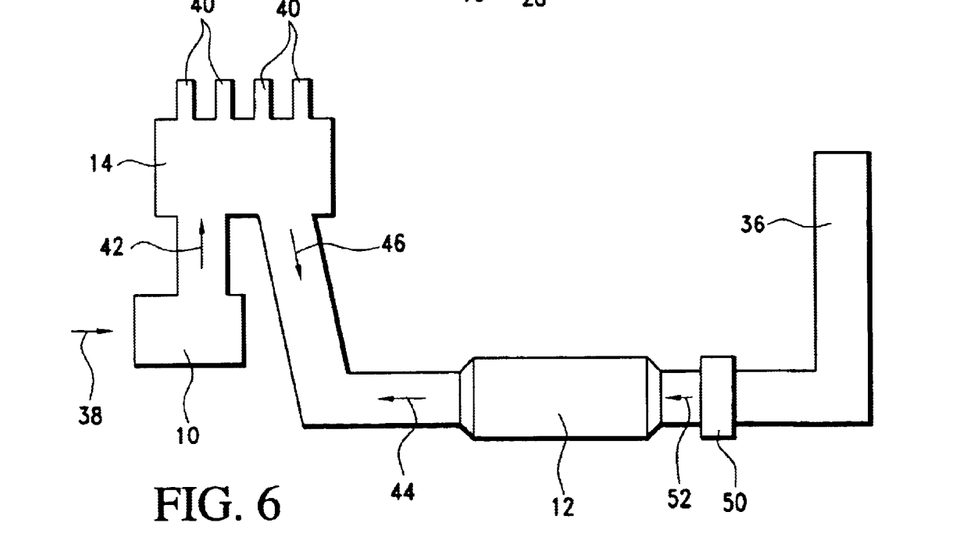
FIG. 6 shows a schematic of the heating system with an auxiliary fan.

FIG. 6 shows a schematic of a heating system with an auxiliary fan. The heating system corresponds in many parts to the heating system as shown in FIG. 1 or the heating system of the prior art as shown in FIGS. 14 & 15. In addition, in the flow direction upstream of the auxiliary heater there is an auxiliary fan 50 which produces an auxiliary flow 52. In this way, it is possible to increase the volumetric flow or the pressure of the auxiliary heater to such an extent that the auxiliary heater 12 is not overpressurized under any operating conditions. Furthermore, damming is not necessary to ensure stable and careful heater operation. Thus, even at low rpm of the auxiliary heater 12 overpressurization can be prevented. In the auxiliary heater 12, on the average, lower temperatures prevail so that the components are less stressed. More uniform operation of the auxiliary heater 12 which requires especially few control cycles can take place, by which the burner in the auxiliary heater 12 is less stressed. The thermal energy contribution of the auxiliary heater 12 can be increased since the maximum heat output becomes greater. Furthermore, a cleaner starting and burnout cycle can be ensured. Since there need not be any damming and associated with it any exhaust opening, less thermal energy is lost.

In the heating system as shown in FIG. 6, it is fundamentally possible to provide the auxiliary fan 50 with a turn-on or turn-off function. This enables especially simple triggering, for example, via a relay. However, it is also possible to continuously control the auxiliary fan 50. This can be done directly by the heater control device. In the case of turn on-turn off control, i.e., without rpm change, the heater control device can generate an implementation signal. It is likewise possible to form this signal via an additional temperature sensor, for example, a bimetallic component.

Interventions into the operation of the auxiliary fan 50 can take place under different assumptions. The auxiliary fan can, for example, always be turned on when the heating device is turned on. In another case, turning on the auxiliary fan 50 can be made dependent on turning on the motor vehicle heater 10. Likewise, it can be provided that only in the case of overpressurization or damming, is the auxiliary fan connected.

In FIG. 6, the position of the auxiliary fan 50 upstream of the auxiliary heater 12 is shown. This position is preferable since, in this way, the auxiliary fan 50 is not exposed to thermal stress. It is also possible to move the auxiliary fan 50 into the area of the air inlet 36. If an auxiliary fan 50 is chosen which withstands a certain thermal stress, it is also possible to place the auxiliary fan 50 downstream of the auxiliary heater 12, i.e., between the auxiliary heater 12 and the mixing chamber 14.

Figure 7:
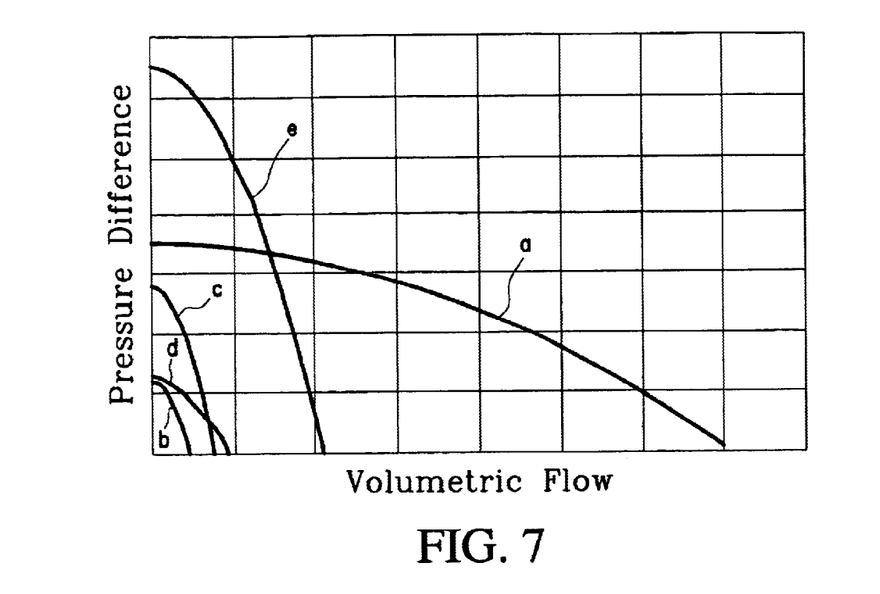
FIG. 7 shows a diagram in which the differences of the pressures upstream and downstream of the auxiliary air heater or motor vehicle heater system are plotted against the volumetric flow.

FIG. 7 shows a diagram in which the differences of the pressures upstream and downstream of the auxiliary air heater or the motor vehicle heater are plotted against the volumetric flow. These fan characteristics should in part be viewed only qualitatively. Curve a shows the characteristic of a fan of a motor vehicle heater at a high stage. Curve b shows the characteristic of a comparatively small fan of an auxiliary heater at a relatively low rpm; curve c shows the characteristic of the same fan at elevated rpm. Curve d shows the characteristic of a larger fan at a relatively low rpm; curve e shows the characteristic of the same fan at elevated rpm.

Characteristics b, c, d of the auxiliary heating fans which do not intersect the characteristic a of the motor vehicle heater fan indicate that the fan of the auxiliary heaters, at the respective rpm, cannot overcome the counterpressure of the motor vehicle heater. This leads to overpressurization of the heater.

Characteristic e of the auxiliary heating fan intersects the characteristic a of the motor vehicle heater fan. This means that, at the indicated rpm, the auxiliary heater fan can apply a higher pressure than the motor vehicle heater fan, and in doing so, furthermore, can deliver hot air in the correct direction. Therefore, overpressurization of the heating system cannot occur. The smaller auxiliary heating fan according to characteristics b and c cannot react to the motor vehicle heater fan either at low or high rpm. Regardless of the rpm, overpressurization of the heating system occurs. For a larger fan, this overpressurization takes place only at low rpm according to characteristic d.

In any case, it should be noted that the indicated characteristics are cold characteristics so that, even when using a large auxiliary heater fan, it is a good idea to use an auxiliary fan. This is because, in heating operation, the indicated high pressures between 6 and 7 millibars cannot build up, since the volumetric flow also decreases with increasing counterpressure, and thus, the hot air temperature rises. At maximum pressure, the heat of the heat exchanger can no longer be dissipated, overheating and thus overheating shut-off occur. Moreover, it should be watched that the auxiliary heater is also shut off or adjusted down from time to time at lower counterpressures; this is accompanied by a drop in the rpm of the auxiliary heater fan. This entails the danger of overpressurization of the heating system. In starting operation the fan of the auxiliary heater cannot generally be operated at full load so that, with respect thereto, likewise an auxiliary fan is useful to prevent overpressurization of the heating system.

Figure 8:
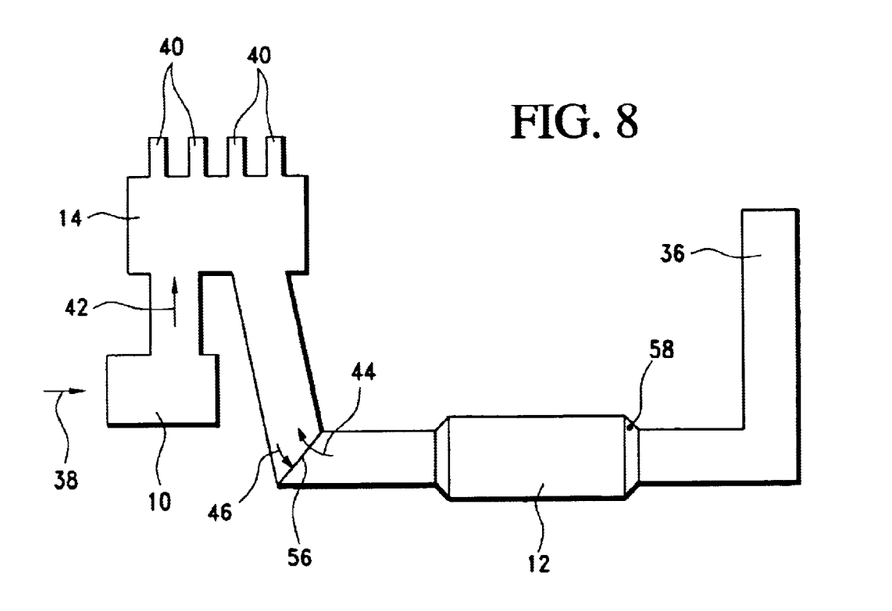
FIG. 8 shows a schematic of a heating system with a nonreturn flap.

FIG. 8 shows a schematic of a heating system with a nonreturn flap. The heating system shown corresponds to a large extent to the heating system of the prior art as shown in FIGS. 14 & 15 or the heating systems which were explained in conjunction with FIGS. 1 to 6. However, in this embodiment, there is no auxiliary fan (50, FIG. 6) or any exhaust opening (16, FIG. 1), and no changeover damper (18, FIG. 1). Auxiliary components are a nonreturn flap 56 between the auxiliary heater 12 and the mixing chamber 14 or the motor vehicle heater 10 and an additional temperature sensor 58 at the inlet area of the auxiliary heater 12. The additional temperature sensor 58 can be attached directly to the control device of the auxiliary air heater 12. Preferably the sensor should be located freely in the air flow, in order to achieve as little inertia as possible. The connections and possible plugs on the temperature sensor should however be made watertight.

In the heating system shown in FIG. 8, the overpressurization of the heating system is counteracted as follows. The nonreturn flap 56 allows flow from the auxiliary heater 12 into the mixing chamber 14 when the pressure conditions allow normal operation. If overpressurization of the heating system by increased counterpressure 46 occurs, total damming of the auxiliary heater 12 by the nonreturn flap 56 occurs. A temperature sensor (not shown) which is generally provided anyway in the auxiliary heater 12 recognizes this total damming as a result of the temperature rise which takes place and shuts off the auxiliary heater 12. The additional temperature detector 58 of the auxiliary heater 12 is used as a redundant safety element. Specifically, if the nonreturn flap 56 is defective, and thus, overpressurization of the heating system occurs, from time to time a temperature sensor located, for example, in the outlet area of the auxiliary heater 12 cannot ascertain a temperature rise. In the area of the temperature detector 58, at the entry area of the auxiliary heater 12, however the backflowing air will be sufficiently heated by the auxiliary heater 12 so that the temperature rise can be used as a reliable indicator for overpressurization. Depending on the states of other motor vehicle components, in the control device of the auxiliary heater 12 different program executions can be handled.

For example, if the ignition of the motor vehicle and/or the motor vehicle heater 10 are turned on, when the burner is turned off the rpm of the auxiliary heater 12 can be raised so far that in any case a sufficient amount of air can be made available for cooling the components in the intended direction. In other words: the control pause rpm of the auxiliary heater 12 is set up from a low value, preferably to 100%. If conversely the ignition of the motor vehicle or the motor vehicle heater 10 is turned off, the especially strong rpm increase of the auxiliary heater 12 is abandoned; this is associated with a lower noise development. In other words: a "normal" control pause with a control pause rpm of roughly 15 to 30% of the full load rpm takes place. The transfer of the auxiliary heater fan 12 to the control pause can take place instead of a likewise usable fault interlock. Here it is preferred that the heater 12 can execute only a limited number of successive transitions to a control pause. Afterwards the heater is transferred into a state with fault interlock.

In the system shown in FIG. 8, in addition, it can be provided that, on the blow-out side of the auxiliary air heater 12, there is a cooling opening which is preferably closed with a so-called duckbill. This makes it possible for at least a little air transport to take place with total damming of the auxiliary heater 12 and the resulting high pressure in the system and the heated air to be kept away from sensitive components. If, at the same time, the opening is made as a hole at the correct location, it can be used as a drain for condensation water.

Figure 9:
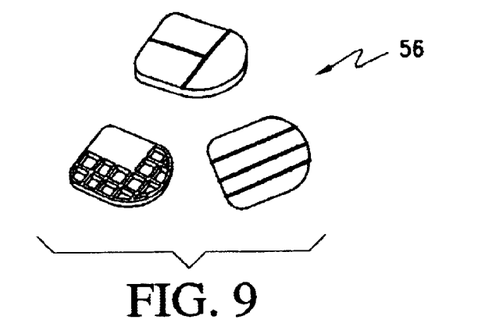
FIG. 9 shows three perspectives of a nonreturn flap in different perspectives or installation states.

FIG. 9 shows three perspective views of a nonreturn flap in various perspectives or installation states. Common to the three examples of nonreturn flaps 56 shown is that there is a lattice-shaped carrier with one or more elastic tabs located thereon. The tabs can completely cover the lattice-shaped carrier.

Figure 10:
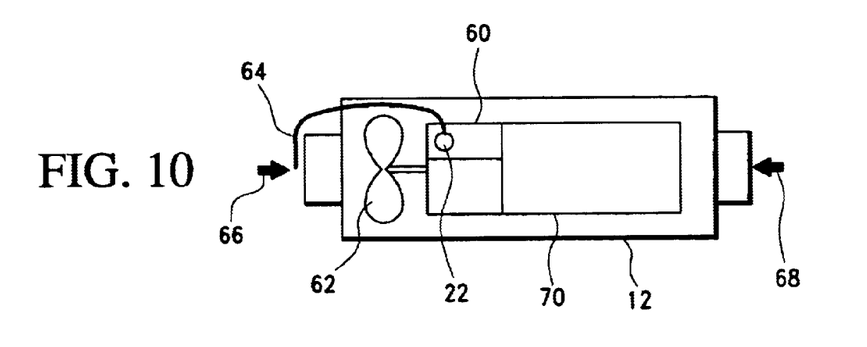
FIG. 10 shows a schematic of an auxiliary air heater with a pressure differential sensor.

FIG. 10 shows a schematic of an auxiliary heater 12 with a pressure difference sensor 22. Furthermore a control device 60, a fan 62 and a heat exchanger 70 are shown. On the control device 60, a pressure difference sensor 22 is mounted and is connected via a pressure line 64 to the area upstream of the auxiliary heater 12, i.e., the inflow area. The pressure difference sensor 22 is thus able to measure the difference of the pressure 66 upstream and the pressure 68 downstream of the auxiliary heater 12. This signal can be input directly to the control device 60. If an overly large pressure difference is established, depending on the embodiment of the remaining heating system, a conclusion regarding overpressurization or damming is drawn. The auxiliary heater 12 is then turned off or shifted into another operating mode.

Other possibilities for detection of overpressurization involve using a wind direction sensor or a flow sensor. It can detect the flow direction, and processes can be used which are based on an impeller, on calorimetric determination via a heated wire or on ultrasound. Furthermore the rpm change of the fan can be used as an indicator for overpressurization since the rpm rises as soon as the heater is dammed or overpressurized. This rise of the fan rpm can be detected and evaluated via the heater control device 60.

Figure 11:
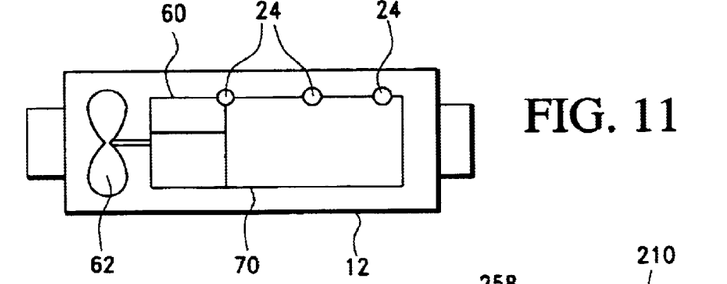
FIG. 11 shows a schematic of an auxiliary air heater with temperature sensors.

FIG. 11 shows a schematic of an auxiliary heater 12 with several temperature sensors 24, and otherwise a structure similar to FIG. 10 can be recognized. These temperature sensors 24 are located at different positions of the auxiliary heater 12. The information of the various temperature detectors 24 can be used differently. There are, for example, operating conditions under which, in the case of overpressurization, the temperatures of the temperature sensor 24 in the area of the control device 60 and of the middle temperature sensor 24 rise, while the temperature of the temperature sensor 24 in the area of the output of the auxiliary heater 12 drops. This state can be used, for example, as an indicator for overpressurization. Likewise, the change of temperature on the temperature detectors over time can be used within the framework of gradient evaluation. A positive gradient evaluation can be used, specifically with respect to those temperature sensors 24 in which in the case of overpressurization a temperature increase can be expected. For other temperature sensors 24, in which a drop of the temperature in the case of overpressurization can be expected, a negative gradient evaluation can be used. It must be considered that, in special operating states of the heater, for example, at the start of operation in the cooled state, certain secondary conditions prevail.

For example, at the start of operation, hot air from the interior can be suddenly supplied to a thoroughly cooled heater, by which a high temperature gradient is determined. It would be erroneous to use this as an indicator for overpressurization. Likewise, initial indications of a temperature increase on the overpressurization sensor should not be converted directly into measures against overpressurization. Rather, repeated measurements of the measured values should be used or different measured values which are redundant should be used as the criterion for a countermeasure to overpressurization.

Depending on the system used, to prevent overpressurization external influencing factors can play a major part. In particular, when the temperature is evaluated it can be a good idea to include the outside temperature, the intake temperature, the on state of the vehicle heater, the degree of damming of the intake heater and/or the prior state of the vehicle heater when considering measures. Then different operating modes of the system result from any combinations of these influencing factors.

Figure 12:
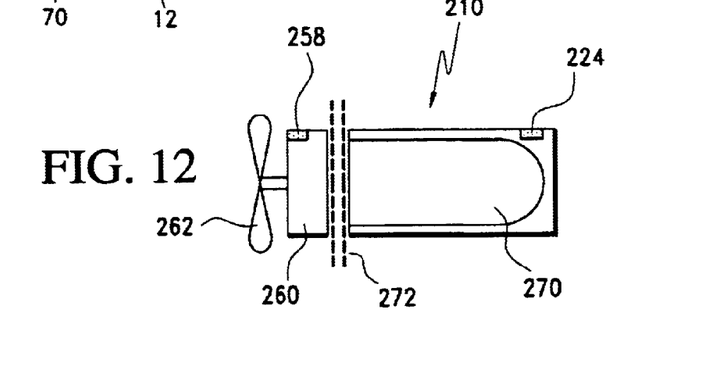
FIG. 12 shows a schematic of an air heater in accordance with the invention.

FIG. 12 shows a schematic of an air heater 210 in accordance with the invention. The air heater 210 comprises a heat exchanger 270 and a temperature sensor 224 which is located in the area of the heat exchanger 270. This temperature sensor 224 is used within the framework of conventional overheating protection of the air heater 210. Within the heat exchanger 270 there is a burner (not shown). Furthermore, the air heater 210 comprises a control device 260 and a hot air rotor or fan 262 for delivering the air which is to be heated to the air heater 210. In the air inlet area, i.e., especially in the area of the control device 260, there is another temperature sensor 258 which is generally used within the framework of temperature determination of the air entering the air heater 210. Based on this temperature determination of the entering air, the operation of the air heater 210 can be optimized.

Within the framework of this invention, the situation is considered in which backflow of hot air takes place. This backflow of hot air can, for example, cool the temperature sensor 224 so that, initially, there is apparently no reason to shut off the burner of the air heater. The hot air flowing in the opposite direction travels into the area of temperature-sensitive components of the control device 260; this ultimately can lead to damage or failure of the control device 260.

The invention uses the temperature information which has been acquired by the temperature sensor 258 in order to avoid such a situation. To do this, for example, the temperature rise over time in the area of the temperature sensor 258 in the control device 260 can be monitored. When the boundary value of the gradient is exceeded, the burner is transferred into an operating state with lower heat output as a measure; the burner is, for example, turned off. Optionally, aftercooling can be performed. Likewise, it is alternatively or additionally possible to take into account the situation caused by the flow reversal when the temperature of the temperature sensor 258 exceeds a certain absolute boundary value.

Figure 13:
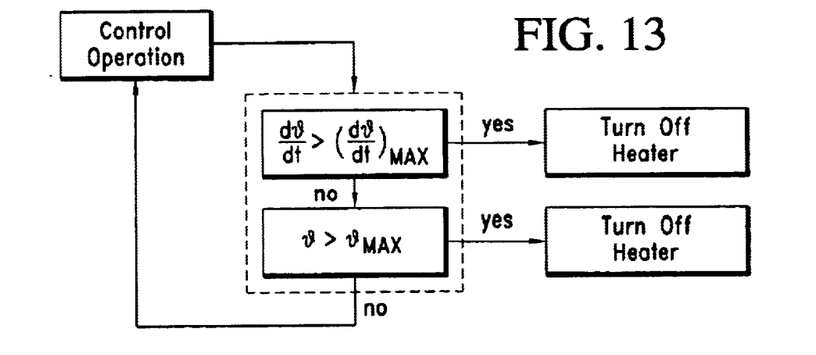
FIG. 13 shows a flow chart for explanation of a process in accordance with the invention for detecting the backflowing of hot air through the air heater.

FIG. 13 shows a flow chart for explanation of a process in accordance with the invention for detection of backflowing hot air through an air heater. Proceeding from control operation of the control device, it is determined within the framework of the process of the invention whether the temperature gradient (dv/dt) over time is greater than the maximum temperature gradient $(dv/dt)_{MAX}$. If this is the case, the heater can, for example, be turned off. In the other case, another check can be carried out; it is checked whether the absolute temperature v is greater than the maximum temperature $v_{MAX}$. If this is the case, this can also be used as the criterion for shutting off the heater, for example. If not, there is a transition to normal control operation; this also means that, in turn, the already described check according to the invention takes place subsequently.

It should be appreciated that, while in connection with FIGS. 1–9, arrangements were described in which two heaters are present in a common flow line, the heater and process of FIGS. 12 & 13 will find applicability in even single heater environments. That is, backflow can also be a problem in single heater environments in which a backflow of air can arise, e.g., due the occurrence of damage to the fan or damage or obstruction of the air flow line.

The aforementioned description of embodiments of the invention is used only for illustrative purposes and not for purposes of limitation of the invention. Within the framework of the invention, various changes and modifications are possible without departing from the scope of the invention and its equivalents.

What is claimed is:

1. Heating system for heating air comprising
   at least one first heater;
   at least one second heater; and
   at least one flow path between the at least one first heater and the at least one second heater; and
   at least one auxiliary fan external to the first heater and the second heater for producing a flow in a direction from the second heater toward the first heater.

2. Heating system as claimed in claim 1, wherein at least one auxiliary fan forms a means for countering an overpressurization backflow toward said second heater.

3. Heating system as claimed in claim 1, wherein the first heater is a motor vehicle heater and the second heater is an auxiliary heater.

4. Heating system as claimed in claim 3, wherein at least one mixing chamber in said flow path and in which air from the at least one first heater and air from the at least one second heater enter and mix.

5. Heating system as claimed in claim 1, wherein the auxiliary fan is located upstream of the second heater.

6. Heating system as claimed in claim 2, further comprising a control device for actuating the auxiliary fan depending on an output signal thereof.

7. Heating system as claimed in claim 6, further comprising at least one pressure sensor for detecting pressure states in the heating system, said at least one pressure sensor producing an input signal for said control device.

8. Heating system as claimed in claim 6, further comprising at least one temperature sensor for detecting temperature states in the heating system, said at least one temperature sensor producing an input signal for said control device.

9. Heating system as claimed in claim 2, further comprising at least one temperature sensor for detecting temperature states in the heating system; and wherein the auxiliary fan is actuatable directly in response to an output signal of said at least one temperature sensor.

10. Air heater with
    a burner,
    a heat exchanger,
    an air inlet area,
    an air exit area,
    a control device, and
    a temperature sensor located in the air inlet area for monitoring the temperature in the air inlet area,
    wherein said control device is operative far transferring the burner into a state with lower heat output when a temporal temperature change exceeds a boundary value; and
    wherein said boundary value is a maximum positive temperature gradient.

11. Air heater as claimed in claim 10, wherein the state with lower heat output to which the burner is transferred when the temporal temperature change exceeds the boundary value is a turned off state of the burner.

12. Air heater as claimed in claim 10, wherein said control device is responsive to occurrence of a backflow condition toward said burner.

* * * * *